Sept. 25, 1956　　L. LAVALLEE ET AL　　2,764,353
STEAM TRAP

Filed Dec. 31, 1953　　　　　　　　　　2 Sheets-Sheet 1

INVENTORS
Léonard LAVALLEE
Raymond RABY

BY

ATTORNEYS

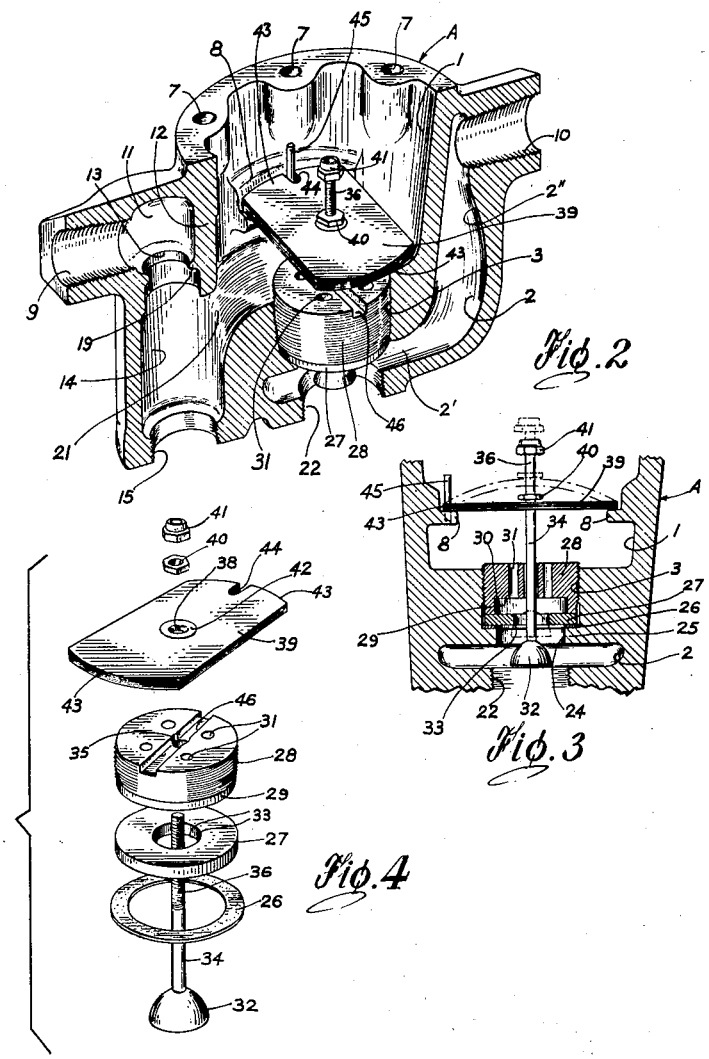

United States Patent Office 2,764,353
Patented Sept. 25, 1956

2,764,353

STEAM TRAP

Leonard Lavallee and Raymond Raby, St. Jean, Quebec, Canada, assignors, by direct and mesne assignments, to Workrite Company Ltd., Montreal, Quebec, Canada, a corporation of Quebec Application December 31, 1953, Serial No. 401,561

2 Claims. (Cl. 236—59)

The present invention relates to a steam trap and more particularly to a steam trap adapted to collect water of condensation from steam apparatus and automatically discharge it into a tank or hot well or into the boiler itself with a minimum loss of steam.

Most steam traps in common use at the present time are constructed under the float principle: a float opens a valve to discharge the condensate when the condensate level in the trap has reached a predetermined maximum.

Most of these traps are complicated in design and construction and their valve mechanism tends to wear out rather quickly resulting in steam loss.

The steam trap, according to the present invention, is based on a different principle, namely, on the difference in temperature between the steam and condensate, said difference of temperature causing a bi-metal element to open or close the steam trap valve.

According to the present invention, the bi-metal element of the steam trap is capable of exerting a sufficient force on the valve to close the same tightly against the steam pressure exerted on the latter.

Accordingly, the general object of the present invention is the provision of a steam trap operable by the difference of temperature between the steam and condensate in order to retain the steam and discharge only the condensate.

An important object of the present invention is the provision of a steam trap of the character described which is very simple and inexpensive to manufacture.

Another important object of the present invention is the provision of a steam trap of the character described in which all the component parts may be easily taken apart for cleaning, repairs and the like.

Another important object of the present invention is the provision of a steam trap of the character described in which the bi-metal element is so arranged and located within the trap so as to exert a maximum force on the valve head of the steam trap valve.

Still another important object of the present invention is the provision of a steam trap of the character described, whicch may be easily adjusted according to the pressure of the steam.

Another important object of the present invention is the provision of a steam trap of the character described which may be mounted in any position with respect to the vertical without impairing its functioning.

Another important object of the present invention is the provision of a steam trap in which the inlet and outlet orifices are aligned to facilitate insertion of said steam trap in an existing pipe line.

Still another important object of the present invention is the provision in a steam trap of the character described of a removable valve seat in the form of an annular disk of symmetrical structure, any one of the two faces of the disk being adapted to be used as a seat whereby the life service of said valve seat is substantially increased because when one face is worn out, the disk is simply reversed and its other new face used as the seat.

Yet another important object of the present invention is the provision, in a steam trap of the character described, of a valve member slidably connected to the bi-metal element whereby said valve member is free to move respectively to said bi-metal element to close the valve, even when the bi-metal element is in valve opening position. Due to this construction, the steam trap can operate as a check valve to prevent return flow of the liquid through the steam trap in the event of a surge of the back pressure.

The foregoing and other important objects of the present invention will become more apparent during the following disclosure and by referring to the drawings in which:

Figure 2 is a cut away perspective view of the same;

Figure 3 is a partial cross-section of the same; and

Figure 4 is an exploded perspective view of the valve assembly.

Figure 1:
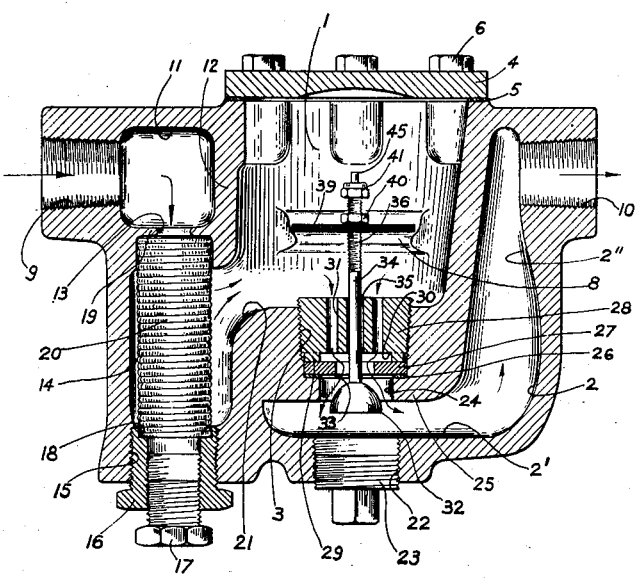
Figure 1 is a longitudinal section of the steam trap according to the invention.

Referring now more particularly to the drawings in which like reference characters indicate like elements throughout, the steam trap according to the invention, consists in a casing, generally indicated at A, providing a main, substantially cylindrical, chamber 1 and a substantially L-shaped outlet chamber 2 having its horizontal leg 2' disposed underneath and in communication with the chamber 1 by means of the threaded bore 3.

The open upper end of the casing A is normally closed by a cover 4, shown in Figure 1, which is pressed in contact with a sealing ring 5 by means of bolts 6 in threaded engagement with the bores 7 made in the walls of the casing A.

Diametrically opposed shoulders 8 extend within the chamber 1 and are integral with the walls of the casing A.

The casing A is provided with aligned inlet and outlet orifices 9 and 10 respectively which are each provided with a tapered thread for fluid tight connection to suitable piping. The inlet orifice 9 opens within a substantially square-shaped inlet chamber 11 separated from the main chamber 1 by a partition wall 12. A passageway 13 establishes communication between the bottom of the inlet chamber 11 and the top of a cylindrical strainer chamber 14 which is provided at its lower end with a threaded opening 15 for receiving a bored plug 16, shown in Figure 1, which is inwardly threaded for engagement with the screw plug 17. The bored plug 16 has a rabbetted inner edge 18 which is aligned with a shoulder 19 formed in the top of chamber 14. The shoulder 19 and the rabbetted edge 18 serve to hold in place a cylindrical strainer 20.

Fluid flows through inlet 9 and chamber 11, passes through the strainer 20 and flows into the main chamber 1 through the passageway 21.

The casing A has a servicing opening 22 which is aligned with the bore 3 whereby the valve member of the valve assembly may be removed as described hereinafter. The opening 22 is normally closed by a threaded plug 23.

The outlet 10 is in communication with the upper end of the vertically extending leg 2" of the L-shaped outlet chamber 2.

The central bore 3 has a restricted lower end 24 forming a shoulder 25 on which rests a washer 26 and a valve seat member in the form of an annular flat metal disk 27 which is secured in place by means of the threaded plug 28 engaging the threaded portion of the bore 3. The plug 28 has an annular rib 29 at its underface which contacts the valve seat 27 and thereby leaves a space 30 for free passage of the fluid emerging from the bores 31 which extend through the plug 28. A valve head 32 of semi-spherical shape is adapted to contact the lower edge 33 of the circular hole of the valve seat 27. Said valve head 32 is rigidly secured to the valve stem 34 which slidably extends through a central bore 35 made in the plug 28. The upper end portion 36 of the stem 34 is threaded and freely passes through a central hole 38 of the bi-metal element 39. The stem portion 36 is connected to said bimetal element 39 by means of nuts 40 and 41 which may be adjusted to vary the effective length of the valve stem 34, that is, the distance between the bimetal element 39 and the valve head 32.

The bi-metal element 39 consists of a plurality of bi-metallic lamellae, the number of which depends on the pressure differential to which the valve assembly of the steam trap will be submitted. The lamellae are assembled by means of a central hollow rivet 42 which provides the central hole 38 of the bi-metal element 39. The latter has an elongated form with rounded end portions 43 adapted to rest on the arcuate shoulders 8 projecting inwardly within the main chamber 1.

In order to prevent rotation of the bimetal element 39, one end of the latter is provided with a notch 44 engageable by an upright pin 45 secured to one shoulder 8.

The bored plug 28 is provided with a groove 46 at its upper face in order to be able to screw and unscrew said plug by the use of a screw driver.

The steam trap, according to the invention, operates as follows: steam and condensate enter the steam trap through inlet orifice 9, is strained by strainer 20 and enters the main chamber 1 of the trap. As long as the bi-metal element 39 remains submerged in the condensate which is at a lower temperature than the steam, it maintains a flat shape, as shown in full line in Figure 3, and therefore the valve head 32 remains spaced from its valve seat 27 and the condensate is continuously discharged through the outlet 10 of the casing A. As soon as the condensate level in the upper chamber 1 drops below the bi-metal element 39, the latter is subjected to a rise in its temperature because it comes in contact with the steam within the main chamber 1. The bi-metal element 39 bends upwardly and lifts the valve head 32 to close the communication between the main chamber 1 and outlet chamber 2, as shown in dotted line in Figure 3.

The trap, according to the invention, effects practically a 100% separation of the condensate from the steam. The valve may be easily adjusted to suit steam pressure or the temperature of the fluid entering the trap by simply rotating the nuts 40 and 41.

The steam trap may be easily cleaned or repaired because all its parts are easily dismountable. For instance, the strainer 20 may be cleaned by removing the plug 17 or it may be replaced by unscrewing the bored plug 16. The bi-metal element 39, plug 28 and seat 27 may be reached by removing the cover plate 4. The valve head 32 and its valve stem 34 may be removed through the servicing opening 22.

Due to the fact that the valve stem 34 is free to move upwardly with respect to the bi-metal element 39, the valve assembly can act as a check valve to prevent back flow of the condensate from the chamber 2 to the main chamber 1 upon increase of the back pressure to a value higher than the pressure in the steam line connected to the inlet 9.

Due to the symmetrical shape of disk 27, either one of its faces may be used as a seat for the semi-spherical valve head 32. Therefore, when one face is worn out, the disk 27 is simply reversed to provide a completely new valve seat opposite the valve head 32. Due to this characteristic alone, the life of the steam trap according to the invention will be much longer than already known steam traps.

Because the valve stem 34 is connected to the middle portion of the bi-metal element 39, and the two ends of said bi-metal element 39 rests on the opposite shoulders 8, the force exerted by the bi-metal element on the valve is greater than if the bi-metal element was secured at one end to the casing and had the valve stem connected to its other free end.

While a preferred embodiment according to the present invention has been illustrated and described, it is understood that various modifications may be resorted to without departing from the spirit and scope of the appended claims.

What we claim is:

1. In a steam trap, a body defining two chambers, said body having a threaded bore establishing communication between said two chambers, a step formed in said bore, an annular flat valve seat removably positioned on said step, a plug threadedly engaging said bore and having an annular rib abutting said valve seat to retain the same in position on said step, said plug having a central guiding bore and a plurality of fluid passageways spaced from said central guiding bore to establish communication between said two chambers, a valve member adapted to engage the inner edge of the hole of said annular valve seat to close communication between said two chambers, a valve stem secured to said valve member, a bi-metal element having a hole made in its middle portion and having its two ends removably supported in one of said chambers, said stem slidably extending through said central guiding bore of said plug and through said hole of said bi-metal element, means engaging the outer end portion of said stem projecting through said bi-metal element to adjustably connect said stem to said bi-metal element, and outlet orifice communicating with one of said chamber and an inlet orifice opening in the other of said chambers.

2. A steam trap comprising a body defining a main upper chamber and an outlet lower chamber, said body having a bore establishing communication between said two chambers, a step formed in said bore, an annular flat valve seat removably positioned on said step, a plug threadedly engaging said bore and having an annular rib abutting said valve seat to retain said valve seat in position on said step, said plug having a central guiding bore and having a plurality of fluid passageways extending therethrough spacedly around said central guiding bore to establish communication between said main chamber and said valve seat, a valve member disposed within said lower chamber and having a spherical surface portion adapted to engage the inner edge of the hole of said annular valve seat to close communication between said two chambers, a valve stem secured to said valve member and threaded at its outer end, a bi-metal element having a hole made in its middle portion and having its two ends removably supported in said main chamber, said stem slidably extending through said central guiding bore of said plug and through said hole of said bi-metal element, nuts threaded on the outer end portion of said stem projecting through said bi-metal element, an inlet orifice communicating with said main chamber and an outlet orifice communicating with said outlet chamber.

References Cited in the file of this patent
UNITED STATES PATENTS

| | | |
|---|---|---|
| 1,204,265 | Freeman | Nov. 7, 1916 |
| 1,219,515 | Whittelsey | Mar. 20, 1917 |
| 1,907,145 | Broman | May 2, 1933 |
| 2,057,150 | Kehl | Oct. 13, 1936 |
| 2,447,067 | Hamilton | Aug. 17, 1948 |
| 2,629,553 | Velan | Feb. 24, 1953 |